July 30, 1957 N. A. CRITES 2,801,100
SPRING STRUCTURES
Filed May 28, 1953
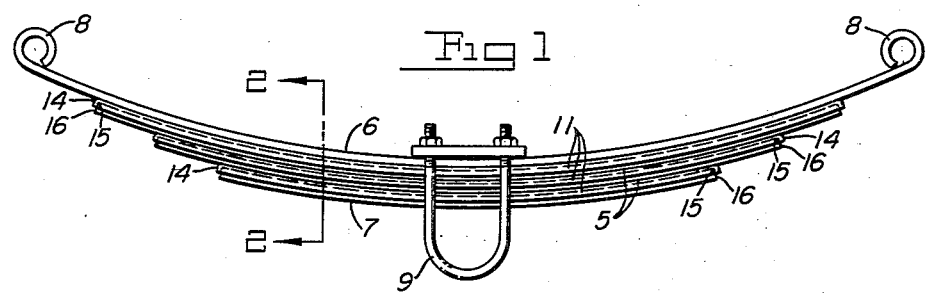
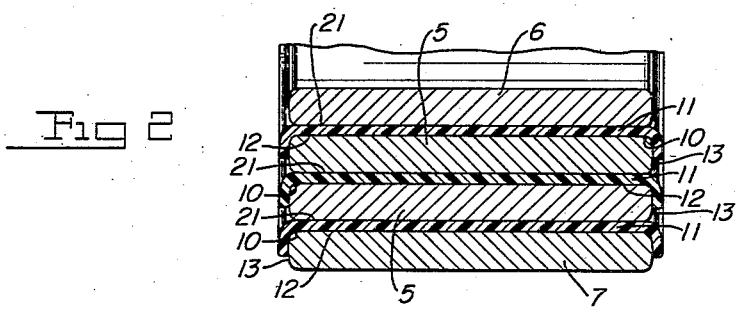
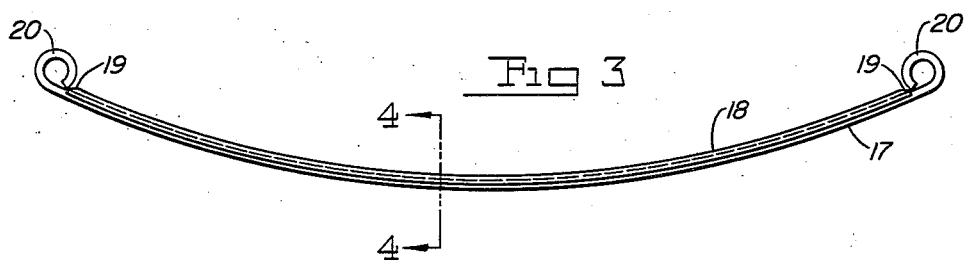
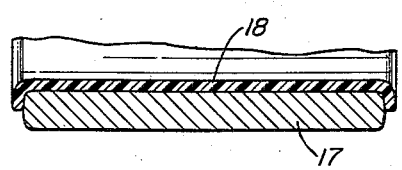
INVENTOR.
Nelson A. Crites
BY
ATTORNEYS.

United States Patent Office 2,801,100
Patented July 30, 1957

2,801,100

SPRING STRUCTURES

Nelson A. Crites, Columbus, Ohio, assignor, by mesne assignments, to Standard Steel Spring Company, Coraopolis, Pa., a corporation of Pennsylvania Application May 28, 1953, Serial No. 358,053

1 Claim. (Cl. 267—49)

This invention relates to polyethylene coated steel products, and, in particular, to polyethylene coated steel leaf-spring structures.

It has long been the object of improvements in the spring manufacturing art, to obtain springs which are quieter in operation with a minimum of maintenance and lubrication. Longer spring life has been a further goal sought in this art.

Interleaf spacers have been used to produce quieter operation, with varying degrees of success. The use of interleaf spacers has produced quieter operation, but has brought with it the problems of matching the spacer life with that of the spring. Interleaf spacers of the usual materials, such as either wood, pressboard, canvas impregnated or covered by grease, or other similar lubricant, or soft bearing metals have deteriorated under the constant rubbing action which takes place between the leaves of the spring structure while in use. This deterioration has been further accentuated by the shifting of the spacer responsively with the rubbing action.

Various types of external sheaths have been employed to cover the edges of spring structures for the purpose of protecting the edges of the steel spring leaves from corrosion. This has been considered of importance to spring life, as it is along these highly stressed edges that corrosion causes weakness, which in turn leads to early spring failure.

An object of this invention is to provide a spring structure with interleaf spacers which do not shift during interaction between the spring leaves, thus prolonging interleaf spacer life.

Another object of this invention is to provide a spring structure with interleaf spacers which will cover the edges of the spring leaves, thus prolonging spring life without the use of external sheaths.

Still another object of this invention is to provide spring structures with interleaf spacers which will have a life equal to the spring life with which they are used.

A further object of this invention is to provide a spring structure with interleaf spacers which will operate quietly without lubrication and with greatly reduced maintenance care.

Other objects and advantages of the present invention will become apparent from the following detailed description thereof, when read in conjunction with the accompanying drawings, in which:

Fig. 1 is a side elevation view of a typical leaf-spring structure;

Fig. 2 is a sectional view taken along the line 2—2 in Fig. 1;

Fig. 3 is a side elevation view of a typical leaf spring; and

Fig. 4 is a sectional view taken along the line 4—4 in Fig. 3.

In the past, spring structures have been built in many shapes and having varied constructions. The structure which forms the preferred embodiment of this invention, as shown in Figs. 1 and 2, is that type which is composed of elliptically formed steel plates or leaves 5, placed one upon another, usually decreasing in length respectively from a main plate 6 progressively to a "short" plate 7. The main plate 6 usually has a pair of eyes 8 at its ends for attachment to a frame member, not shown; and the structure is usually clamped by a U-bolt means 9 to an axle member, not shown, which is in contact with "short" plate 7. Each leaf has edges 10, which appear as corners in Fig. 2, and are usually rounded. A familiar example of this type of spring structure is the one being used to support the rear axles of present-day automobiles.

In the most common practice of the spring manufacturing art, spring leaves are substantially rectangular in cross section taken perpendicular to the longest dimension. In many instances, the rectangular shape is modified, to some extent, to obtain certain desired operational characteristics. These cross-section modifications may be in the form of cut-out portions, as the result of grooves running longitudinally. The cross-section may have a parabolic edge contour. However, it will be understood that in the most common practice, the cross section remains substantially rectangular, even though modified.

Persons acquainted with the art are familiar with the concept that one side of the spring leaf will be in tension when the spring is flexed, and the opposite side will be in compression. From this has come the terminology which refers to one side as the "normally" tension side and the opposite side as the compression side. The term "normally" is used because in some cases prestressing techniques are used to modify these conditions.

In general, the present invention relates to spring structures which have interleaf spacers composed of a coating of polyethylene, which is securely bonded to the steel spring leaves and to spring leaves which have a coating of polyethylene securely bonded thereon.

In Figs. 1 and 2, a spacer 11 is shown comprising a layer of polyethylene bonded to a tension-side surface 12 of spring leaves 5—5 and 7. The spacer 11 is continued around the edges 10—10 and down the sides 13—13 of the spring leaves and bonded thereto.

The polyethylene layer is continued the full length of each spring leaf. On the leaves 5—5 and 7, at each end 14, the layer may be extended around the end edge 15 and down the end surface 16 far enough to produce an effective bond.

Figs. 3 and 4 show a single leaf 17 coated with a layer 18 of polyethylene according to this invention. The layer 18 is bonded to the spring leaf 17 in the same manner as previously described for a leaf of the spring structure, except at each end 19, where it is terminated close to eyes 20.

This single leaf may be used alone or a similar leaf may be used as a main leaf of a spring structure composed of multiple leaves. In either case, the advantage of protection against corrosion is provided.

Interleaf spacers of polyethylene are resistant to acid, alkalies, and water; are not affected by temperature within the range of normal atmospheric conditions, and are extremely tough and resistant to abrasion by rubbing of the spring leaves on each other during spring operation. When continued around the edges and down the sides, the spacers protect these surfaces from corrosion.

As a further advantage, these spacers are quiet when exposed to sliding friction forces. Although it is not known why, it has been established that springs coated as disclosed in this invention will not squeak in operation when used without external lubricants. Since it is known that the coefficient of friction between steel and polyethylene is high, compared with many other spacer materials on steel, it is supposed that the vibrations, if any, produced by the rubbing action between the polyethylene and the steel leaf at the unbonded contact line 21 are not of normal audio frequency. Thus, although it cannot be said that the interleaf spacers of this invention are self-lubricating, for practical purposes the effect is the same, as they are noiseless and do not excessively wear during the useful life of the spring structure.

By effectively bonding the polyethylene to the spring leaves, an interleaf spacer is provided which does not tear or wear out. This is because the springleaf provides added strength and support which helps the coating to withstand the normal interspring rubbing action. The bond referred to above is the effective fusion of the steel surface with the surface of the polyethylene layer. The strength of adherence achieved is great enough that the polyethylene is reinforced by the greater tensile strength of the steel. The method of achieving this bond is described in a copending application entitled "Method and Apparatus for Coating Springs," Serial No. 352,540, filed May 1, 1953. It comprises applying a layer of polyethylene at a temperature of 500–615° F. to steel at a temperature of 350–600° F. The materials bond together at their surfaces of contact, causing the layer to adhere to the steel.

A problem which is common in the prior art is keeping the loose interleaf spacers in place. This problem has been met by the use of clips and covers. The present invention solves this problem without the use of clips and covers, as the bond prevents the spacers from slipping out.

Spring structures have been manufactured according to this invention and have fulfilled the purposes herein set forth. For example, an automobile spring structure was made having polyethylene interleaf spacers .040-inch thick. This structure was tested on a spring-flexing machine.

This machine consists of means for holding the spring structure by its eyes in a similar manner as under an automobile, and means for mechanically gripping the structure at its center point and moving this center up and down. The motion of the center simultates the action of a spring structure during normal operation of the automobile on the highway. In this machine, the amount of travel performed by the center point in one direction is considered a stroke. A cycle is defined as two strokes, i. e., one up and one down to normal position.

In the example test, the stroke was set at 5 inches, which is equivalent to having the automobile wheel strike a bump with a force sufficient to flex the spring up against a frame-stop. The structure under test was flexed through one million cycles without spring or spacer failure. The spacers indicated a maximum of .010-inch wear at the pressure points, which is where the spacer at the leaf end rubs the leaf above.

The Manual of Design and Application of Leaf Springs, War Engineering (1944), published by the Society of Automotive Engineers states at page 77 that 100,000 full-load cycles on a flexing machine is equivalent to 100,000 miles of automobile highway travel. It is seen that the structure of the above example performed well beyond the normal life of an automobile, and the spacer has an equal life.

Other test spring structures according to this invention have shown similar results. The thickness of the layer has been varied between .020 inch and .060 inch and there has not been any change in the result. It is believed that the thickness of the layer is not a determining factor in the successful practice of this invention, provided it is thicker than the amount of wear.

Thus, it is seen that this invention provides a spring structure which is quiet in operation and which has interleaf spacers which will have a life substantially equal to the life of the spring structure.

In the spring structure of this invention, the interleaf spacer provides a corrosion-proof cover for the spring-leaf edges and which will protect these highly stressed edges from corrosion, thus increasing spring life by preventing failure at these critical points.

While the form of the embodiment of the present invention herein disclosed constitutes a preferred form, it is to be understood that other forms might be adopted, all coming within the spirit of the invention.

What is claimed is:

A multiple-leaf spring structure comprising superposed steel spring leaves, each substantially rectangular in cross section taken perpendicular to its longest dimension and disposed in adjacent spaced relation to the next leaf with the widest rectangular surfaces of adjacent leaves substantially parallel to each other, and polyethylene interleaf spacers in the spaces between adjacent leaves, each said polyethylene spacer being securely bonded by surface fusion at elevated temperature to the tension-side surface of the adjacent leaf that has its tension side contiguous to said spacer and to portions of the sides and ends of said leaf bordering on said tension-side surface, said polyethylene spacer being in sliding engagement with the compression-side surface of the other adjacent leaf, and said spacers serving as wear-preventing bearing members between adjacent leaves and at the same time as corrosion-preventing films on said tension-side surfaces of said leaves.

References Cited in the file of this patent

UNITED STATES PATENTS

| Re. 14,870 | Hamilton | June 1, 1920 |
|---|---|---|
| 1,967,088 | Geyer | July 17, 1934 |
| 2,643,955 | Powers et al. | June 30, 1953 |
| 2,649,297 | Dow | Aug. 18, 1953 |
| 2,666,637 | Lindeman | Jan. 19, 1954 |
| 2,667,347 | Jacobs | Jan. 26, 1954 |

FOREIGN PATENTS

| 571,867 | Great Britain | Sept. 12, 1945 |
|---|---|---|
| 602,420 | Great Britain | May 26, 1948 |